United States Patent
Yanagi et al.

(10) Patent No.: US 7,891,385 B2
(45) Date of Patent: Feb. 22, 2011

(54) SEALING PUMP-UP DEVICE

(75) Inventors: Hideshi Yanagi, Kodaira (JP); Daisuke Sugio, Kodaira (JP); Kazuma Nakazawa, Kodaira (JP); Shinichi Iwasaki, Tokyo (JP); Rieko Iwasaki, legal representative, Tokyo (JP); Yuji Takeda, Kodaira (JP); Masaki Yoshida, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 892 days.

(21) Appl. No.: 11/597,740

(22) PCT Filed: May 26, 2005

(86) PCT No.: PCT/JP2005/009614
§ 371 (c)(1),
(2), (4) Date: Jun. 22, 2007

(87) PCT Pub. No.: WO2005/115730
PCT Pub. Date: Dec. 8, 2005

(65) Prior Publication Data
US 2009/0056850 A1    Mar. 5, 2009

(30) Foreign Application Priority Data

May 27, 2004  (JP) ............................. 2004-157168
Dec. 7, 2004  (JP) ............................. 2004-353686
Feb. 17, 2005  (JP) ............................. 2005-040247

(51) Int. Cl.
*B65B 31/00*    (2006.01)
(52) U.S. Cl. .................... 141/38; 141/104; 141/105; 141/313; 81/15.6
(58) Field of Classification Search ............. 141/5, 141/38, 44, 98, 100, 104, 105, 114, 231, 141/285, 301–302, 313, 372; 222/372; 81/15.2, 81/15.6; 137/223–234.5, 597, 602, 605–607, 137/635.4; 152/509
See application file for complete search history.

(56) References Cited

U.S. PATENT DOCUMENTS 2,689,675 A    9/1954  Stirrup (Continued)

FOREIGN PATENT DOCUMENTS

JP    2001-505501 A    4/2001

(Continued)

OTHER PUBLICATIONS

Supplementary European Search Report issued in European Application No. 05743610.7-1253 / 1749645 dated Oct. 29, 2010.

*Primary Examiner*—Timothy L Maust
*Assistant Examiner*—Jason K Niesz
(74) *Attorney, Agent, or Firm*—Sughrue Mion, PLLC

(57) ABSTRACT

To reliably supply a predetermined amount of sealing agent into a pneumatic tire even if the device is inclined and after the predetermined amount of sealing agent is supplied, to automatically start feeding compressed air into the pneumatic tire. In pumping device 30, when compressed air is supplied to air chamber 54, internal pressure of air chamber 54 increases, and as the internal pressure of air chamber 54 rises, a contained volume of air chamber 54 increases while a contained volume of liquid container 52 decreases. Thus, sealing agent 100 in an amount corresponding to the amount corresponding to the reduction in the contained volume of liquid container 52, is forcibly discharged from discharge outlet 64 and the discharged sealing agent 100 is injected into tire 90. In pumping device 30, when the air chamber 54 expands enough to have a predetermined amount of sealing agent to be discharged from the liquid container 52, the air discharge opening 92 opens toward the air chamber 54 to allow the air chamber 54 to communicate with the inside of tire 90. Thus, compressed air in the air chamber 54 can be supplied into tire 90 via the air discharge outlet 92, bypass hose 96 and joint hose 68.

10 Claims, 9 Drawing Sheets

U.S. PATENT DOCUMENTS

| | | |
|---|---|---|
| 6,283,172 B1 | 9/2001 | Thurner |
| 6,736,170 B2 * | 5/2004 | Eriksen et al. .............. 141/38 |
| 2003/0056851 A1 * | 3/2003 | Eriksen et al. .............. 141/38 |

FOREIGN PATENT DOCUMENTS

| | | |
|---|---|---|
| JP | 3210863 B2 | 7/2001 |
| WO | WO 02/066236 A1 | 8/2002 |
| WO | WO 03/041949 A1 | 5/2003 |

* cited by examiner

SEALING PUMP-UP DEVICE

FIELD OF THE INVENTION

The present invention relates to a sealing and pumping device. The device is used for injecting a sealing agent for sealing a punctured pneumatic tire into a pneumatic tire, and then providing compressed air into the pneumatic tire to raise internal pressure of the pneumatic tire.

BACKGROUND ART

Recently, a sealing and pumping device has been widely used for repairing a punctured pneumatic tire (hereinafter, simply referred to as "tire") using a sealing agent and then pumping the tire to increase internal pressure thereof to predetermined reference pressure without replacing the tire and a wheel. For example, a known sealing and pumping device is described in Patent Document 1. As shown in FIG. 9, sealing and pumping device 20 of Patent Document 1 includes pressure-proof container 4 containing sealing agent 6, and air compressor 1 as a supply source of compressed air. Air compressor 1 is connected to gas inlet 3 of pressure-proof container 4 via hose 2. Gas inlet 3 can be closed by closure valve 5. Gas inlet 3 is a riser tube extending above a liquid level of sealing agent 6 in pressure-proof container 4. Pressure-proof container 4 has outlet valve 7 from which sealing agent 6 is discharged. Hose 8 is connected to outlet valve 7 at one end thereof. Adapter 9, which is screwed to tire valve 10, is attached to the other end of hose 8.

In sealing and pumping device 20 described above, when a tire is punctured, an adapter 9 is screwed into tire valve 10, and then closure valve 5 is opened to open gas inlet 3 to pressure-proof container 4. Then air compressor 1 is operated to allow compressed air to be supplied to pressure-proof container 4 via gas inlet 3. Thus, internal pressure in pressure-proof container 4 in the air space formed above sealing agent 6 is raised. Sealing agent 6 is discharged from outlet valve 7 by static pressure in the cavity, and is introduced into the tire via tire valve 10. Then, after the liquid level of sealing agent 6 in pressure-proof container 4 is lowered enough to reach the opening of outlet valve 7, the compressed air in pressure-proof container 4 is supplied into the tire via outlet valve 7 and hose 8, and the tire is inflated with predetermined internal pressure.

| Patent Document 1 | Japanese Patent No. 3210863 |
|---|---|

DISCLOSURE OF THE INVENTION

Problems to be Solved by the Invention

However, in sealing and pumping device 20 described in Patent Document 1, if the operator actuates air compressor 1 to allow sealing agent 6 in pressure-proof container 4 to be supplied into the tire while pressure-proof container 4 is in its inclined state, the compressed air begins to be supplied into a tire while a significant amount of sealing agent 6 according to the amount of inclination of pressure-proof container 4 remains in pressure-proof container 4. As a result, the necessary amount of sealing agent cannot be supplied into the tire. If insufficient amount of sealing agent is supplied into the tire, sealing agent cannot be completely filled in the punctured hole. Such tires may have problems that, for example, internal pressure of the repaired tire decrease gradually or the tire may puncture again after restarting traveling.

In view of the aforementioned, an object of the invention is to obtain a sealing and pumping device which reliably supply a predetermined amount of sealing agent into a pneumatic tire even if a container of the sealing agent is inclined, and after the predetermined amount of sealing agent is supplied, automatically starts feeding compressed air into the pneumatic tire.

Means for Solving the Problems

The sealing and pumping device according to claim 1 is a sealing and pumping device for a tire, which injects a liquid sealing agent into a punctured pneumatic tire, and then supplies compressed air into the pneumatic tire to increase internal pressure thereof, the device including: a liquid chamber that receives the sealing agent, and is provided with a first discharge outlet for communicating with the inside of the pneumatic tire, the liquid chamber reducing its contained volume and discharging the sealing agent through the discharge outlet upon receiving predetermined compressive load in a compression direction from outside; an air chamber provided adjacent to the liquid chamber, a contained volume of the air chamber increasing as internal pressure is raised by compressed air fed therein from outside and the air chamber decreasing the contained volume of the liquid chamber by applying a compressive load to the liquid chamber in the compression direction; and a second discharge outlet that, when the air chamber expands enough for a predetermined amount of the sealing agent to be discharged from the liquid chamber via the first discharge outlet, opens to the inside of the air chamber to allow the air chamber to communicate with the inside of the tire.

In the sealing and pumping device according to claim 1, the compressed air is first supplied to the air chamber disposed adjacent to the liquid chamber to increase internal pressure of the air chamber. As the internal pressure of the air chamber rises, the contained volume of the air chamber increases and compressive load is applied to the liquid container. Thus, the contained volume of the liquid container decreases. Thus, the sealing agent in an amount corresponding to the amount of expansion of the contained volume of the air chamber, i.e., in an amount corresponding to the reduction in the contained volume of the liquid container, is forcibly discharged from a discharge outlet by air pressure and the discharged sealing agent is injected into the tire. With this structure, the sealing agent in the amount corresponding to the reduction in the contained volume of the liquid container can be reliably supplied into the tire regardless of inclination of the liquid container.

In the sealing and pumping device according to claim 1, when the air chamber expands enough to have the predetermined amount of the sealing agent to be discharged from the liquid container via a first discharge outlet as described above, a second air outlet opens to face with the inside of the air chamber. Thus, the air chamber and the tire communicate with each other. After the predetermined amount of the sealing agent is discharged from the liquid container and supplied into the tire, the air chamber can be communicated with the inside of the tire into via the second air outlet and the compressed air in the air chamber can be supplied into the tire. With this structure, compressed air can be supplied into the tire in which a predetermined amount of the sealing agent has been injected, and the tire can be pumped by the compressed air.

The sealing and pumping device according to claim 2 is the sealing and pumping device of claim 1, further including: a sealing agent supply channel that connects the first discharge outlet to communicate with the inside of the pneumatic tire; and a bypass channel that connects with the second discharge outlet to communicate with the sealing agent supply channel at a middle portion thereof between the first discharge outlet and the pneumatic tire.

The sealing and pumping device according to claim 3 is the sealing and pumping device of claim 1 or 2, further including: a cylinder chamber into which compressed air is fed from outside; a movable partition wall disposed in the cylinder chamber, which divides the cylinder chamber into a first compartment and a second compartment, the movable partition wall being movable in an expansion/contraction direction to make the contained volume of the first compartment increase while the contained volume of the second compartment decreases; and a liquid container disposed in the second compartment and having an accordion-folding structure that is expandable/contractible in the expansion/contraction direction, and includes the liquid chamber formed therein, wherein the first compartment is formed as the air chamber.

The sealing and pumping device according to claim 4 is the sealing and pumping device of claim 1 or 2, further including: a cylinder chamber into which compressed air is fed from outside; and a movable partition wall disposed in the cylinder chamber, which divides the cylinder chamber into a first compartment and a second compartment, the movable partition wall being movable in an expansion/contraction direction to make the contained volume of the first compartment increase while the contained volume of the second compartment decrease, wherein the first compartment is formed as the air chamber while the second compartment is formed as the liquid chamber.

The sealing and pumping device according to claim 5 is the sealing and pumping device of claim 3 or 4, wherein the second discharge outlet is open to a region of the inner wall of the second compartment until the predetermined amount of sealing agent is discharged from the liquid chamber via the first discharge outlet.

The sealing and pumping device according to claim 6 is the sealing and pumping device of any one of claims 1 to 5, further including: an air supply device for supplying compressed air into the air chamber to increase the internal pressure of the air chamber.

The sealing and pumping device according to claim 7 is a sealing and pumping device for a tire, which injects a liquid sealing agent into a punctured pneumatic tire, and then supplies compressed air into the pneumatic tire to increase internal pressure thereof, the device including: a liquid chamber which stores a sealing agent, and is provided with a discharge outlet for communicating with the outside, the liquid chamber reducing its contained volume and discharging the sealing agent through the discharge outlet upon receiving predetermined compressive load in a compression direction from outside; a sealing agent supply path connected to the discharge outlet and to the pneumatic tire, allowing the liquid chamber to communicate with the inside of the pneumatic tire; an air chamber provided adjacent to the liquid chamber, a contained volume of the air chamber increasing as internal pressure is raised by compressed air fed in from outside and the air chamber decreasing the contained volume of the liquid chamber by applying a compressive load to the liquid chamber in the compression direction; an air supply device which supplies compressed air into the air chamber to increase the contained volume of the air chamber; a bypass channel, connected to the air supply device and to the sealing agent supply path at a middle portion between the discharge outlet and the pneumatic tire; and an air switching device provided at the bypass channel, and after the air chamber expands enough to make a predetermined amount of the sealing agent discharge from the liquid chamber, the air switching device is made open, from a state in which it closes the bypass channel, to allow the air supply device to communicate with the inside of the pneumatic tire via the bypass channel and via the sealing agent supply path.

In the sealing and pumping device according to claim 7, the compressed air is first supplied to the air chamber to increase internal pressure of the air chamber. As the internal pressure of the air chamber rises, the contained volume of the air chamber increases and compressive load which is along a compression direction is applied to the liquid container. Thus, the contained volume of the liquid container decreases. Thus, the sealing agent in an amount corresponding to the amount of expansion of the contained volume of the air chamber, i.e., in an amount corresponding to the reduction in the contained volume of the liquid container, is forcibly discharged from a discharge outlet by air pressure and the discharged sealing agent is injected into the tire. With this structure, the sealing agent in the amount corresponding to the reduction in the contained volume of the liquid container can be reliably supplied into the tire regardless of inclination of the liquid container.

In the sealing and pumping device according to claim 7, when the air chamber expands enough to have the predetermined amount of the sealing agent to be discharged from the liquid container via the discharge outlet as described above, an air switching device provided at a bypass channel is made to open the bypass channel from a state in which it closes the bypass channel. Thus, an air supply device communicates with the inside of the tire via the bypass channel and a sealing agent supply path. In this manner, after the predetermined amount of the sealing agent is discharged from the liquid container and injected into the tire, the air supply device can communicate with the inside of the tire and the compressed air can be supplied into the tire by the air supply device. Therefore, the compressed air is supplied into the tire in which a predetermined amount of the sealing agent has been injected, and the tire can be pumped by the compressed air.

The sealing and pumping device according to claim 8 is the sealing and pumping device of claim 7, further including: a liquid container having a liquid chamber therein, having an accordion-folding structure that is expandable/contractible in a direction in which the contained volume of the liquid chamber is expanded/contracted; and an air container disposed adjacent to the liquid container, the air container having an air chamber formed therein, having an accordion-folding structure which is expandable/contractible in a direction in which the contained volume of the air chamber is expanded/contracted, wherein when the air supply device supplies compressed air into the air chamber to make the air container expand in the direction in which the contained volume of the air container is expanded/contracted, the liquid container is compressed in the direction in which the contained volume of the liquid container is expanded/contracted and the contained volume of the liquid chamber is reduced.

The sealing and pumping device according to claim 9 is the sealing and pumping device of claim 7, further including: a first bottled pouch formed as a pouch with a laminated film as a substrate, the inside of the first bottled pouch being the liquid chamber; and a second bottled pouch formed as a pouch with a laminated film as a substrate, and disposed adjacent to the first bottled pouch, the inside of the second bottled pouch being the air chamber, wherein when the air supply device supplies compressed air into the air chamber to make the second bottled pouch deform in its expanding direction, the compressive load from the second bottled pouch makes the first bottled pouch deform in a compression direction and a contained volume of the liquid chamber is reduced.

The sealing and pumping device according to claim 10 is a sealing and pumping device for a tire, which injects liquid sealing agent into a punctured pneumatic tire, and then supplies compressed air into the pneumatic tire to increase internal pressure thereof, the device including: a cylinder container that includes a discharge outlet to communicate with the inside of the pneumatic tire and an air supply opening for supplying compressed air into the container, the cylinder container containing a sealing agent; a plunger disposed in the cylinder container, dividing the inside of the cylinder container into a liquid chamber containing a sealing agent to be discharged outside of the container via the discharge outlet and an air chamber into which compressed air is supplied via the air supply opening, the plunger being movable in a direction in which the sealing agent is injected to make a contained volume of the air chamber increase and make a contained volume of the liquid chamber decrease; air supply device that supplies compressed air into the air chamber via the air supply opening and makes the plunger move in the direction in which the sealing agent is injected by pressure of the compressed air; and a bypass channel provided at the cylinder container as a portion on the inner wall surface of the liquid chamber formed as a depression area toward the outside of the container, wherein when the plunger moves in a direction in which the sealing agent is injected by an amount enough such that a predetermined amount of the sealing agent is discharged from the liquid container, the air chamber is made to communicate with the liquid chamber.

In the sealing and pumping device according to claim 10, the compressed air is first supplied by the air supply device to the air chamber in the cylinder container through the air supply opening. A plunger moves in a direction in which the sealing agent is injected by the pressure of this compressed air. Thus, the contained volume of the air chamber is increased and the sealing agent in the liquid chamber is pressurized while the contained volume of the liquid chamber decreases. Thus, the sealing agent in an amount corresponding to the amount of expansion of the contained volume of the air chamber, i.e., in an amount corresponding to the reduction in the contained volume of the liquid container, is forcibly discharged from a discharge outlet by air pressure and the discharged sealing agent is injected into the tire. With this structure, the sealing agent in the amount corresponding to the reduction in the contained volume of the liquid container can be reliably supplied into the tire regardless of inclination of the liquid container.

In the sealing and pumping device according to claim 10, when the plunger has moved in a direction in which the sealing agent is injected by the amount required for the predetermined amount of the sealing agent to be discharged from the liquid container as described above, the air chamber is made to communicate with the liquid chamber via the bypass channel provided at the cylinder container. Thus, the air supply device communicates with the inside of the tire via the air chamber, the bypass channel and the liquid chamber. In this manner, after the predetermined amount of the sealing agent is discharged from the liquid container and injected into the tire, the air supply device can communicate with the inside of the tire and the compressed air can be supplied into the tire by the air supply device. Therefore, compressed air is supplied into the tire in which a predetermined amount of the sealing agent has been injected, and the tire can be pumped by the compressed air.

The sealing and pumping device according to claim 11 is the sealing and pumping device of claim 10, wherein the bypass channel extends from a sliding surface of the inner wall surface of the cylinder container on which the plunger slides, to the open end of the discharge outlet.

The sealing and pumping device according to claim 12 is the sealing and pumping device of claim 10 or 11, wherein the cylinder container integrally includes a channel forming portion forming the bypass channel to face the inside of the liquid chamber.

EFFECT OF THE INVENTION

As described above, according to the sealing and pumping device of the invention, a predetermined amount of sealing agent can be reliably supplied into a pneumatic tire even if a container of the sealing agent is inclined. Moreover, after the predetermined amount of sealing agent is supplied into the pneumatic tire, feeding of compressed air into the pneumatic tire can be automatically started.

BEST MODE FOR IMPLEMENTING THE INVENTION

Figure 1A:
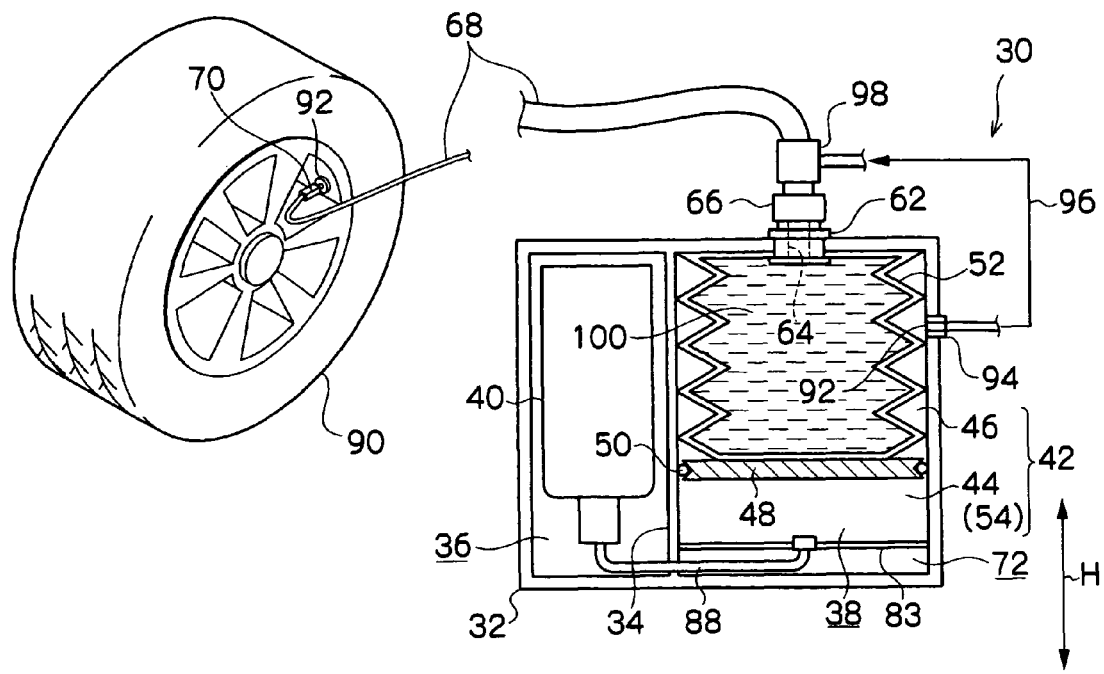
FIG. 1A is a side cross-sectional view of a structure of a sealing and pumping device in accordance with a first embodiment of the invention, in a state before a sealing agent is supplied into a tire.

Now, sealing and pumping devices according to embodiments of the invention will be described.

First Embodiment

Structure of Sealing and Pumping Device

FIG. 1 illustrates a sealing and pumping device for a tire according to a first embodiment of the invention. Sealing and pumping device 30 is used for repairing punctured pneumatic tire (hereinafter, simply referred to as "tire") 90 equipped in a vehicle. Sealing and pumping device 30 repairs tire 90 using a sealing agent and then re-pumps tire 90 to increase internal pressure thereof to predetermined reference pressure without replacing the tire and a wheel As shown in FIG. 1, sealing and pumping device 30 includes cube-shaped case 32 as a housing. Partition wall 34 divides case 32 into two small chambers 36 and 38. Air compressor 40 is disposed in small chamber 36. Air compressor 40 includes a power cable. Electricity can be supplied into air compressor 40 from, for example, a buttery on a vehicle when a plug provided at a distal end of a power cable is fit into a socket of a cigarette liter on the vehicle.

Cylinder chamber 42 is provided in small chamber 38 as a cylindrical space. Disc-shaped movable partition wall 48 is provided in cylinder chamber 42, which divides cylinder chamber 42 into two compartments, 44 and 46, along the height of cylinder chamber 42 (the direction of arrow H). Movable partition wall 48 can be moved in an expansion/contraction direction (i.e., height direction) along which contained volume of lower compartment 44 increases while contained volume of upper compartment 46 decreases. A fitting groove having a half round cross-section is formed along the entire circumference of movable partition wall 48. Seal ring 50 made of elastic material such as silicone rubber is fitted into the fitting groove. With this structure, movable partition wall 48 and the inner circumferential surface of cylinder chamber 42 are reliably sealed together.

Figure 1B:
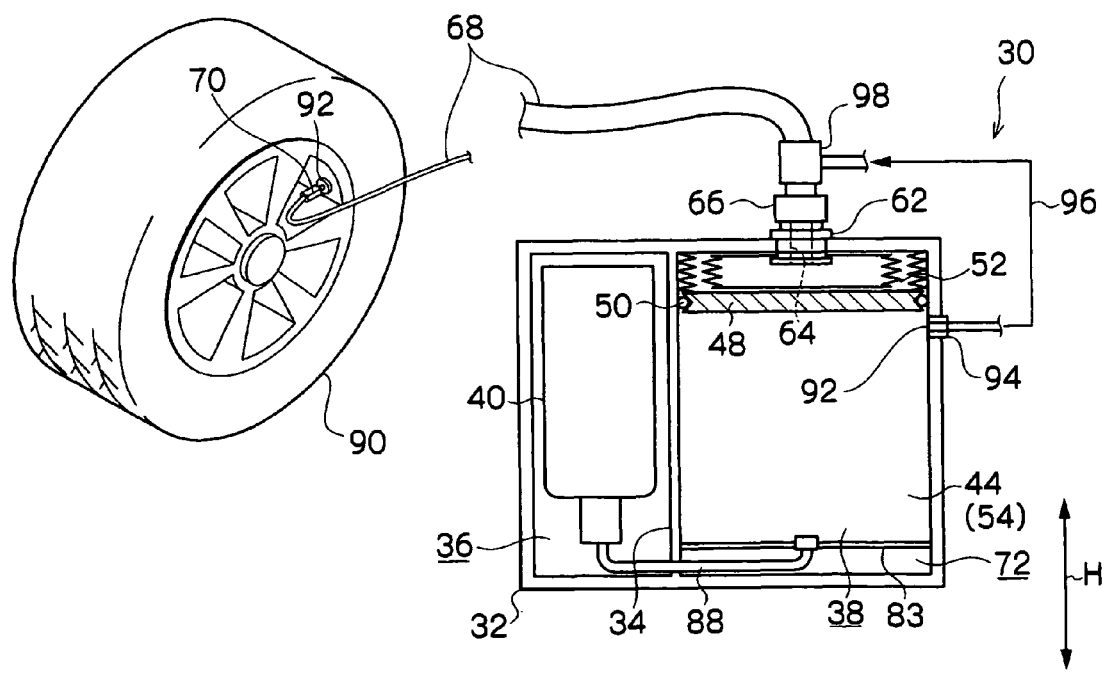
FIG. 1B is a side cross-sectional view of a structure of a sealing and pumping device in accordance with the first embodiment of the invention, in a state after the sealing agent is supplied into the tire.

Liquid container 52 as a liquid chamber which receives sealing agent 100 is provided in upper compartment 46. Lower compartment 44 is formed as air chamber 54 into which compressed air is fed from air compressor 40. Liquid container 52 includes a thin housing made of resin such as polyethylene and polypropylene. A side wall of liquid container 52, as a whole, has an accordion-folding structure and is expandable/contractible in the height direction (the direction of arrow H) as shown in FIG. 1A. When the side wall is fully extended, liquid container 52 has a substantial square pillar or cylinder shape extending along its height. When the side wall is fully contracted, liquid container 52 has a flat plate shape contracted along its height as shown in FIG. 1B. The contained volume of liquid container 52 continuously decreases as side wall becomes contracted from its extended state.

Sealing agent 100 is received in the liquid chamber structured in liquid container 52 in an amount larger than the amount determined for each type of tire 90 to be repaired by sealing and pumping device 30 (e.g., 200 to 400 g).

As shown in FIG. 1A, a top plate of liquid container 52 is fixed to a top plate of a case 32. Connecting ring 62 is fixed to the top plate of liquid container 52 with the top plate of casing 32 being penetrated by connecting ring 62. Connecting ring 62 fixes the top plate of liquid container 52 to the top plate of case 32 such that a connecting hole of liquid container 52 is aligned with a continuous hole of casing 32. The bottom plate of liquid container 52 is fixed to movable partition wall 48, and moved integrally with movable partition wall 48 along the height direction.

Discharge outlet 64 is formed along an inner circumference of connecting ring 62. Joint hose 68 is connected to discharge outlet 64 from outside of casing via closing valve 66. Adapter 70 screwable to tire valve 92 of tire 90 is provided at a distal end of joint hose 68. Closing valve 66 is operated to rotate in a circumferential direction with respect to joint hose 68 so as to open and close between discharge outlet 64 and joint hose 68.

Partition plate 83, which defines piping chamber 72 below air chamber 54, is disposed in lower compartment 44. A distal end of pressure pipe 88, for supplying compressed air to outside, is connected to air compressor 40. Air compressor 40 thus communicates with air chamber 54 via pressure pipe 88. When actuated, air compressor 40 feeds compressed air to air chamber 54 via pressure pipe 88. Air compressor 40 is capable of generating pressure higher than reference pressure defined for each type of tire 90 to be repaired by sealing and pumping device 30 (e.g., at least 3 kgf/cm$^2$).

Air outlet 92 is formed at an upper end of a circumferential wall of cylinder chamber 42. Air outlet 92 faces with the inside of upper compartment 46 until a predetermined amount of sealing agent is discharged from liquid container 52 as shown in FIG. 1A. Substantially at the same time with the completion of discharge of the predetermined amount of sealing agent, air outlet 92 moves relatively downward and reaches below movable partition wall 48. Here, the opening of air outlet 92 faces with lower compartment 44, i.e., with air chamber 54. One end of bypass hose 96 is connected to air outlet 92 from outside of case 32 via nipple 94. The other end of bypass hose 96 is connected so as to communicate with a middle portion of tire valve 92 and adapter 70 of the joint hoses 68 via three-way fitting 98.

(Operation of Sealing and Pumping Device)

Next, a procedure for repairing punctured tire 90 using sealing and pumping device 30 of the present embodiment.

To repair a punctured tire 90, an operator first screws adapter 70 to tire valve 92 and connects joint hose 68 to tire 90.

Then, the operator rotates closing valve 66 in a direction that communicates the insides of joint hose 68 and liquid container 52. Here, as shown in FIG. 1A, liquid container 52 contains sealing agent 100 in an amount larger than a determined amount, and thus side wall 50 is in its fully extended state along the height thereof. In this state, the operator actuates air compressor 40 so that compressed air generated by air compressor 40 is supplied to air chamber 54 via pressure pipe 88. Thus, the internal pressure of air chamber 54 gradually increases, and with the increase of the internal pressure, movable partition wall 48 moves toward liquid container 52 side along the height direction to increase the contained volume of the air chamber. Therefore, liquid container 52 is pushed upward at its bottom plate 54 by a pressing force according to the internal pressure of air chamber 54. In this manner, side wall 50 of liquid container 52 is extended.

Here, the reduction amount in the contained volume of liquid container 52 substantially equals to the expansion amount of air chamber 54. Sealing agent 100 in an amount substantially equal to the reduction amount in the contained volume is forcibly discharged to joint hose 68 via discharge outlet 64, and the compressed sealing agent 100 is injected into tire 90 via joint hose 68.

As shown in FIG. 1B, after liquid container 52 undergoes compression-deformation to a substantial limit and a predetermined amount of sealing agent is discharged from liquid container 52, air outlet 92 is relatively moved downward to reach under movable partition wall 48 and opens to the inside of air chamber 54. Thus, air chamber 54 communicates with the inside of tire 90 via bypass hose 96 and joint hose 68. When air chamber 54 communicates with the inside of tire 90, the compressed air fed from air compressor 40 to air chamber 54 is supplied into tire 90 via bypass hose 96 and joint hose 68. After confirming that the internal pressure of tire 90 has reached predetermined pressure using a pressure gauge (not shown) provided on air compressor 40, the operator stops air compressor 40 and removes the adapter 70 from tire valve 92.

The operator conducts test running using tire 90 filled with sealing agent 100 in a certain period of time after tire 90 is inflated. Sealing agent 100 is thus diffused evenly inside tire 90 and is filled into the punctured hole to close it. After the test running, the operator again screws adapter 70 of the joint hose 68 to tire valve 92 and actuates air compressor 40 to pressurize tire 90 to predetermined internal pressure. In this manner, repair of the punctured tire 90 is completed. Tire 90 can be used for normal running after joint hose 68 is removed.

In sealing and pumping device 30 according to the first embodiment of the invention, the compressed air is first supplied to air chamber 54 disposed adjacent to liquid chamber 52 to increase internal pressure of air chamber 54. As the internal pressure of air chamber 54 rises, the contained volume of air chamber 54 increases and compressive load is applied to liquid container 52. Thus, the contained volume of liquid container 52 decreases. Thus, sealing agent 100 in an amount corresponding to the amount of expansion of the contained volume of air chamber 54, i.e., in an amount corresponding to the reduction in the contained volume of liquid container 52, is forcibly discharged from discharge outlet 64 by air pressure and the discharged sealing agent 100 is injected into tire 90. With this structure, sealing agent 100 in the amount corresponding to the reduction in the contained volume of liquid container 52 can be reliably supplied into tire 90 regardless of inclination of liquid container 52.

In sealing and pumping device 30, when air chamber 54 expands enough to have the predetermined amount of sealing agent 100 to be discharged from liquid container 52 via discharge outlet 64 as described above, air outlet 92 opens to face with the inside of air chamber 54. Thus, air chamber 54 and tire 90 communicate with each other. After the predetermined amount of sealing agent 100 is discharged from liquid container 52 and supplied into tire 90, air chamber 54 can be communicated with the inside of tire 90 via air outlet 92 and the compressed air in air chamber 54 can be supplied into tire 90. With this structure, compressed air can be supplied into tire 90 in which a predetermined amount of sealing agent 100 has been injected, and tire 90 can be pumped by the compressed air.

In sealing and pumping device 30 according to the embodiment of the invention, after sealing agent 100 is injected into tire 90, compressed air is supplied into tire 90. With this structure, it is not necessary to change hoses and the like with respect to tire 90 and thus the repair process for punctured tire 90 can be simplified.

Figure 2A:
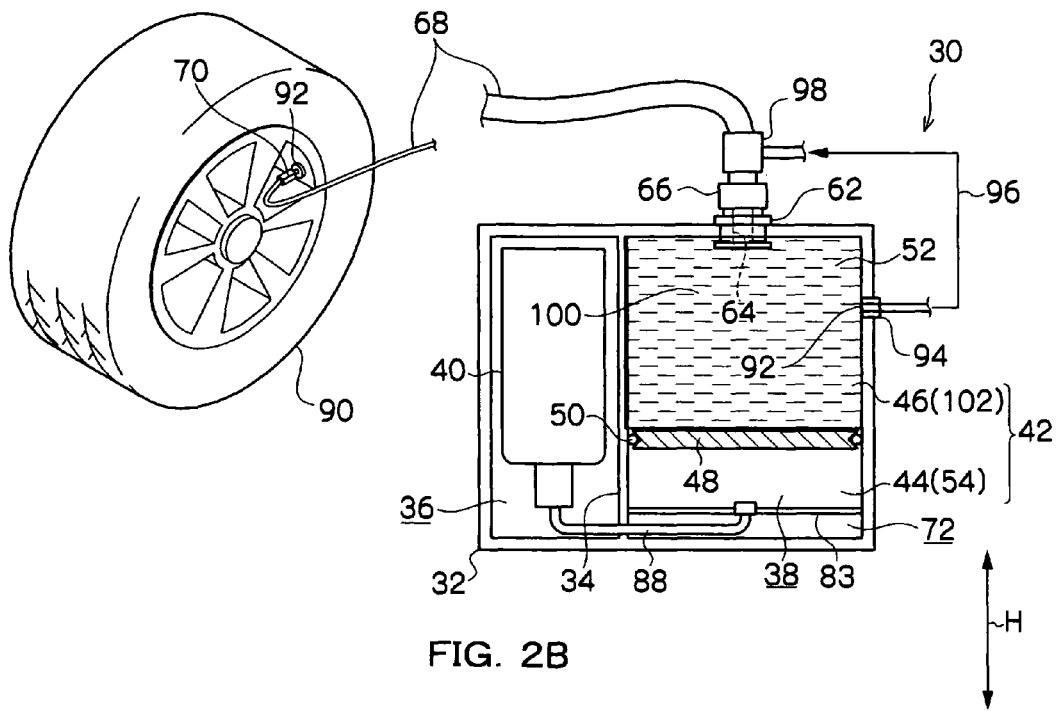
FIG. 2A is a side cross-sectional view of a structure of a sealing and pumping device where a liquid container is not illustrated, in a state before a sealing agent is supplied into a tire.
Figure 2B:
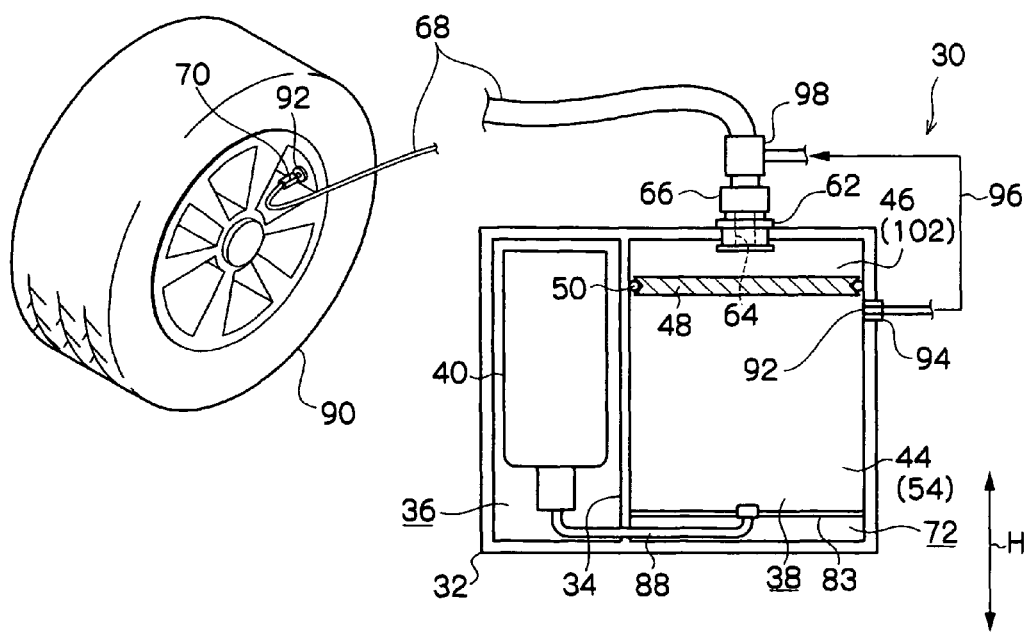
FIG. 2B is a side cross-sectional view of a structure of a sealing and pumping device where a liquid container is not illustrated, in a state after the sealing agent is supplied into the tire.

Note that, in sealing and pumping device 30 shown in FIG. 1, liquid container 52 is disposed in upper compartment 46 of cylinder chamber 42 and is contracted by pressure from movable partition wall 48 to make sealing agent 100 discharged. However, as shown in FIG. 2, upper compartment 44 may be formed as liquid chamber 102 in which liquid container 52 is disposed, and the pressure from movable partition wall 48 may be applied directly to sealing agent 100 in liquid chamber 102. With the movement of movable partition wall 48, liquid chamber 102 may be contracted so that sealing agent 100 is discharged from discharge outlet 64.

Second Embodiment

Structure of Sealing and Pumping Device

FIG. 3 illustrates a sealing and pumping device of a tire according to a second embodiment of the invention. Note that, in sealing and pumping device 110 according to the second embodiment, components common to those of sealing and pumping device 30 according to the first embodiment are denoted by the same reference numerals and description thereof will be omitted.

Figure 3A:
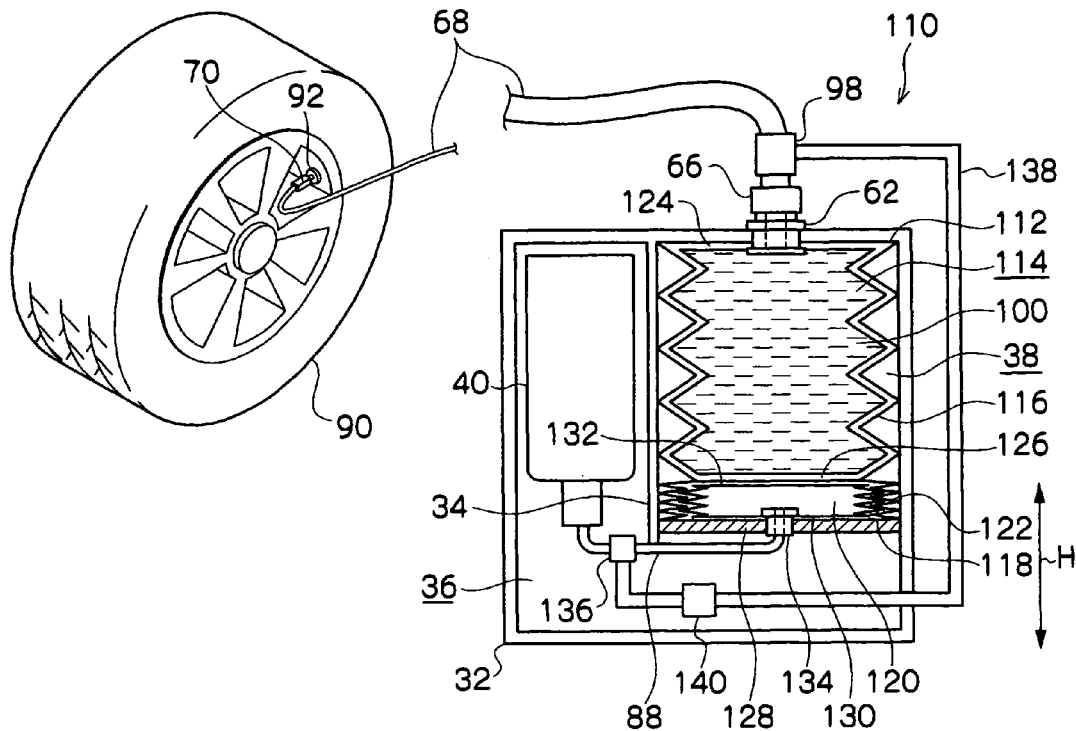
FIG. 3A is a side cross-sectional view of a structure of a sealing and pumping device in accordance with a second embodiment of the invention, in a state before a sealing agent is supplied into a tire.
Figure 3B:
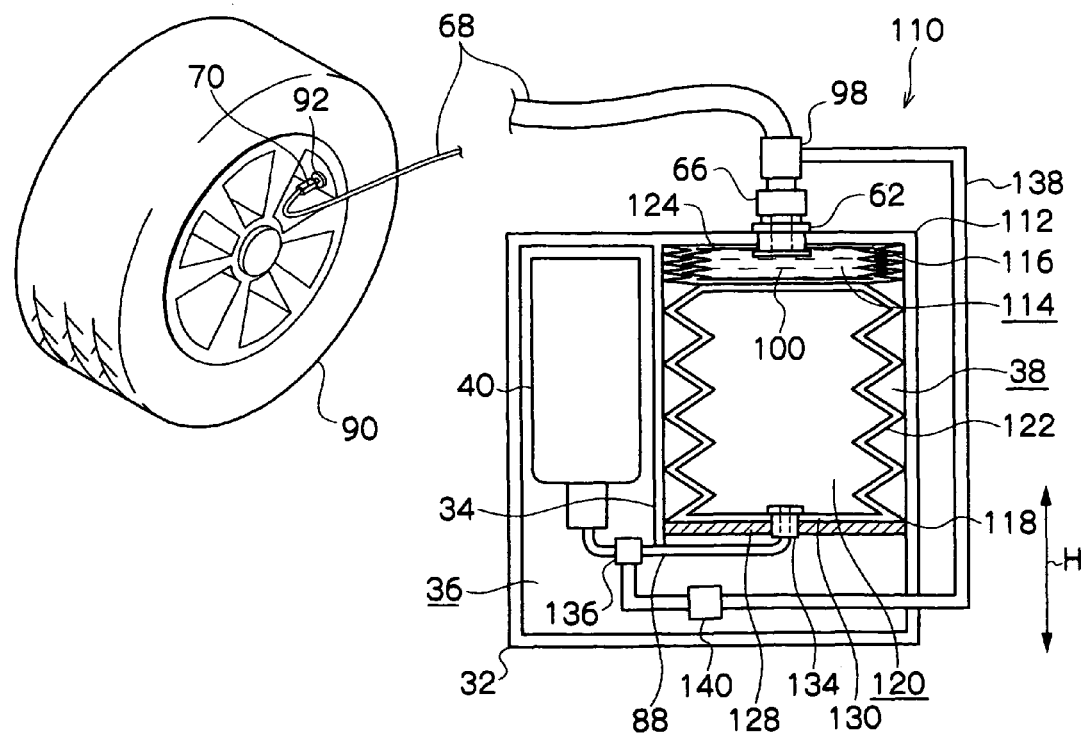
FIG. 3B is a side cross-sectional view of a structure of a sealing and pumping device in accordance with the second embodiment of the invention, in a state after the sealing agent is supplied into the tire.

As shown in FIG. 3, liquid container 112 is disposed at an upper portion of small chamber 38 of case 32. The internal space of liquid container 112 is formed as liquid chamber 114 which receives sealing agent 100. Liquid container 112 includes a thin housing made of resin such as polyethylene and polypropylene. Side wall 116 of liquid container 112 has an accordion-folding structure and is expandable/contractible in the height direction (the direction of arrow H) as shown in FIG. 3A. When side wall 116 is fully extended, liquid container 52 has a substantial square pillar or cylinder shape extending along its height. When the side wall is fully contracted, liquid container 52 has a flat plate shape contracted along its height as shown in FIG. 3B. The contained volume of liquid container 112 continuously decreases as side wall 116 becomes contracted from its extended state. In sealing and pumping device 110, sealing agent 100 is received in liquid chamber 114 in an amount determined for each type of tire 90 to be repaired (e.g., 200 to 400 g).

Air container 118 is disposed at a lower portion of liquid container 112 in small chamber 38 of case 32. The internal cavity of air container 118 is formed as air chamber 120 which receives air. Similar to liquid container 112, air container 118 also has a thin outer envelope made of resin such as polyethylene and polypropylene. Side wall 122 of air container 118 has an accordion-folding structure and is expandable/contractible in the height direction (the direction of arrow H) as shown in FIG. 3B. When side wall 116 is fully extended, air container 118 has a substantial square pillar or cylinder shape extending along its height. When the side wall is fully contracted, air container 118 has a flat plate shape contracted along its height as shown in FIG. 3A. The contained volume of air container 118 continuously increases as side wall 122 becomes extended from its contracted state. The contained volume of air container 118 in its extended state (expanded state) is slightly larger than the contained volume of liquid container 112 receiving a predetermined amount of sealing agent 100.

As shown in FIG. 3A, top plate 124 of liquid container 112 is fixed to a top plate of a case 32. Connecting ring 62, having a pipe shape, is fixed to top plate 124 of liquid container 112 and the top plate of casing 32 to penetrate them. Connecting ring 62 allows the inner space of liquid container 112 to communicate with joint hose 68. Case 32 includes partition 128 which closes a bottom side of small chamber 38. Bottom plate 130 of air container 118 is fixed to partition 128. Connecting ring 134, having a pipe shape, is fixed to bottom plate 130 of air container 118 and partition 128 to penetrate them. Connecting ring 134 allows pressure pipe 88 to communicate with the inner space of air container 118. Bottom plate 126 of liquid container 112 and top plate 132 of air container 118 are connected and fixed with each other and are integrally moved together in the height direction thereof.

In pressure pipe 88, three-way fitting 136 is disposed between air compressor 40 and air container 118. In sealing and pumping device 110, bypass pipe 138 is provided which is connected to three-way fitting 136 at one end and connected to three-way fitting 98 at the other end. Three-way fitting 98 is disposed between connecting ring 62 and joint hose 68. Relief valve 140, for which predetermined relief pressure PO is set in advance, is provided in a middle portion of bypass pipe 138. When the internal pressure of bypass pipe 138 at air compressor 40 side is lower than the relief pressure PO, relief valve 140 remains closed such that bypass pipe is closed. When the internal pressure of bypass pipe 138 at air compressor 40 side reaches to the relief pressure PO, relief valve 140 opens such that bypass pipe 138 is opened.

(Operation of Sealing and Pumping Device)

Next, a procedure for repairing punctured tire 90 using sealing and pumping device 110 according to the present embodiment.

To repair a punctured tire 90, an operator first screws adapter 70 to tire valve 92 and connects joint hose 68 to tire 90.

Then, the operator rotates closing valve 66 to a direction it opens to allow joint hose 68 to communicate with the inside of liquid container 112. Here, as shown in FIG. 3A, liquid container 112 contains sealing agent 100 in an amount larger than a predetermined amount, and thus side wall 116 is in its fully extended state along the height thereof. In contrast, side wall 122 of air container 118 is in its fully contracted state along the height thereof. In this state, the operator actuates air compressor 40 so that compressed air generated by air compressor 40 is supplied to air container 118 (air chamber 120) via pressure pipe 88. Thus, the internal pressure of air chamber 120 gradually increases, and with the increase of the internal pressure, side wall 122 of air container 118 is extended and air container 118 expands along its height direction. Thus, liquid container 112 receives, at bottom plate 126 thereof, pressure from top plate 132 of air container 118 corresponding to the internal pressure of air chamber 120. The contained volume of liquid container 112 gradually decreases while side wall 116 gradually contracts.

At this time, sealing agent 100 in an amount substantially corresponding to the reduction in the contained volume of liquid container 112, is forcibly discharged into joint hose 68. The sealing agent 100 in a compressed state is then injected into tire 90 via joint hose 68.

As shown in FIG. 3B, when air container 118 is in its substantially completely expanded state, liquid container 112 almost completely undergoes compressive deformation, and a predetermined amount of sealing agent is discharged from liquid container 112, the internal pressure (air pressure) in air chamber 120 is gradually raised by the air fed from air compressor 40 in a compressed state. With the rise of the internal pressure of air chamber 120, the internal pressure of pressure pipe 88 between air compressor 40 and relief valve 140 increases. At this time, when the internal pressure of bypass pipe 138 at air compressor 40 side is raised to the relief pressure PO, relief valve 140 opens from its closed state to open bypass pipe 138. Thus, air compressor 40 is allowed to communicate with the inside of tire 90 via pressure pipe 88, bypass pipe 138 and joint hose 68, and the compressed air generated by air compressor 40 is began to be supplied into tire 90.

Then, the operator stops air compressor 40 and removes the adaptor 70 from tire valve 92 after confirming that the internal pressure of tire 90 has reached predetermined pressure by using a pressure gauze (not shown) provided at air compressor 40. The operator conducts test running using tire 90 filled with sealing agent 100 in a certain period of time after tire 90 is inflated. Sealing agent 100 is thus diffused evenly inside tire 90 and is filled into the punctured hole to close it. After the test running, the operator again detects the internal pressure of tire 90 and, if necessary, re-pressurizes tire 90 to a predetermined internal pressure. In this manner, the puncture of tire 90 is repaired. Tire 90 can be used for normal running after joint hose 68 is removed from tire 90.

In sealing and pumping device 110 according to the present embodiment as described above, the compressed air is first supplied to air chamber 120 from air compressor 40. As the internal pressure of air chamber 120 rises, the contained volume of air chamber 120 increases, and air container 118 expands. Thus compressive load is applied to liquid container 112 from air container 118 so that the contained volume of liquid chamber 114 decreases. Thus, sealing agent 100 in an amount corresponding to the amount of expansion of the contained volume of air container 118, i.e., in an amount corresponding to the reduction in the contained volume of liquid chamber 114, is forcibly discharged from liquid container 112 by air pressure. The discharged sealing agent 100 is injected into tire 90 via joint hose 68. With this structure, sealing agent 100 in the amount corresponding to the reduction in the contained volume of liquid container 112 can be reliably supplied into tire 90 regardless of inclination of liquid container 112 (liquid chamber 114).

In sealing and pumping device 110, when air container 118 expands enough to have the predetermined amount of sealing agent 100 to be discharged from liquid container 112 as described above, relief valve 140 provided at bypass pipe 138 is switched to the open state from the closed state. Thus, air compressor 40 is allowed to communicate with the inside of tire 90 via bypass pipe 138 and joint hose 68. In this manner, after the predetermined amount of sealing agent 100 is discharged from liquid container 112 and injected into tire 90, the air compressor is allowed to communicate with the inside of tire 90 and the compressed air may be supplied into tire 90 by air compressor. Therefore, compressed air is supplied into tire 90 in which a predetermined amount of sealing agent 100 has been injected, and tire 90 can be pumped to a predetermined internal pressure by the compressed air.

In sealing and pumping device 110 according to the embodiment of the invention, after sealing agent 100 is injected into tire 90, compressed air is supplied into tire 90. With this structure, it is not necessary to displace joint hose 68 for supplying sealing agent with a joint hose for supplying air with respect to tire 90. In this manner, the repair process for punctured tire 90 can be simplified.

In sealing and pumping device 110 relating to the present embodiment, a mechanical relief valve 140 is provided at bypass pipe 138 and relief valve 140 is opened and closed by the air pressure in bypass pipe 138. However, in place of relief valve 140, an electromagnetic relief valve, for example, incorporating a pressure sensor may also be provided at bypass pipe 138. The electromagnetic relief valve may open through an electromagnetic solenoid and the like in response to the pressure sensor detecting that the pressure has reached the relief pressure PO. Alternatively, a timer for clocking time of injection of sealing agent 100 may be provided at sealing and pumping device 110. The electromagnetic relief valve may be opened in response to the clock signal from the timer.

Third Embodiment

FIG. 4 illustrates sealing and pumping device 150 according to a modified embodiment of a third embodiment of the invention. Note that, in sealing and pumping device 150 according to the third embodiment, components common to those of sealing and pumping device 110 according to the second embodiment are denoted by the same reference numerals and description thereof will be omitted.

As shown in FIG. 4, a pouched liquid container 152 is accommodated in small chamber 38 of case 32 at one end opposite to partition plate 34 along the width direction of the device (arrow W direction). The internal space of liquid container 152 is formed as liquid chamber 153 which receives sealing agent 100. Cap 154 is screwed onto a top portion of liquid container 152. A base end of joint hose 68 is fixed to cap 154 such that the base end of joint hose 68 penetrates cap 154 and is inserted inside of liquid container 152. Liquid container 152 is formed as a pouch from laminated film 156 as a base material. Laminated film 156 is formed by laminating, in this order from inside, a resin film of PE (polyethylene), a metal film of aluminum foil, and a resin film of PET (polyethylene terephthalate).

Figure 4A:
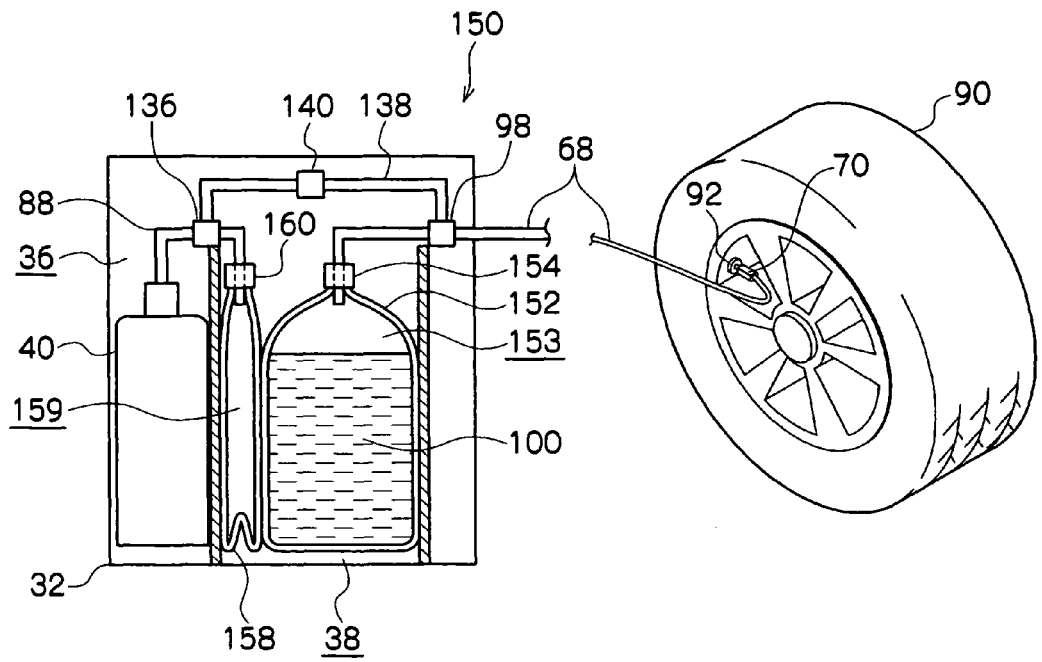
FIG. 4A is a side cross-sectional view of a structure of a sealing and pumping device in accordance with a modified embodiment of a third embodiment of the invention, in a state before a sealing agent is supplied into a tire.

Liquid container 152 is generally referred to as a "bottled pouch". Liquid container 152 is usually formed by heat-sealing end portions of laminated film 156, which has been cut into flat pieces corresponding to three-dimensional liquid container 152. Liquid container 152 is in its expanded state along the width thereof as shown in FIG. 4A until sealing agent 16 is injected into tire 90. If compressive load is applied to liquid container 152 in the width direction thereof, liquid container 152 easily collapses and the contained volume of liquid chamber 153 decreases depending on the amount of deformation of liquid container 152. Sealing agent 100 is received in liquid container 152 in an amount prescribed for each type of tire 90 to be repaired (e.g., 200 to 400 g).

Air container 158 is disposed adjacent to liquid container 152 in its width direction in small chamber 38 of case 32. An internal cavity of air container 158 is formed as air chamber 159 which receives air. Similar to liquid container 152, air container 158 is formed as a bottled pouch. Air container 158 is flat in its width direction with substantially no air inside, as shown in FIG. 4A, until injection of sealing agent 100 into tire 90 is begun. As in liquid container 152, air container 158 includes cap 169 screwed onto the top plate thereof. A base end of pressure pipe 88 is fixed to and penetrate cap 160. The base end of pressure pipe 88 is thus placed inside of air container 158.

As shown in FIG. 4A, in sealing and pumping device 150, when air compressor 40 begins feeding compressed air into air container 118 with air container 118 having substantially no air therein, air container 158 gradually expands in the width direction thereof. The side wall (laminated film 156) of air container 118 pushes the side wall of liquid container 152. Thus, liquid container 152 is compressed in the width direction thereof in an amount corresponding to the amount of expansion of air container 158 and the contained volume of liquid chamber 153 decreases.

Next, a procedure for repairing punctured tire 90 using sealing and pumping device 150 of the present embodiment.

To repair a punctured tire 90, an operator first connects a base end of joint hose 68 to liquid container 152 via cap 154. Then the operator screws adapter 70 onto tire valve 92 to allow liquid container 152 to communicate with the inside of tire 90 via joint hose 68.

Then, the operator actuates air compressor 40 to allow the compressed air generated by air compressor 40 to be supplied to air container 158 (air chamber 159) via pressure pipe 88. Thus, the internal pressure of air chamber 159 gradually rises, and with the rise of the internal pressure, air container 158 expands along its width direction. Liquid container 152 receives pressure corresponding to the internal pressure of air chamber 120 from air container 158 and contracts along its width direction. Thus, the contained volume of liquid chamber 153 decreases.

At this time, sealing agent 100 in an amount substantially equal to the amount reduction in the contained volume of liquid container 152 is forcibly discharged to joint hose 68. Thus, the compressed sealing agent 100 is injected into tire 90 via joint hose 68.

Figure 4B:
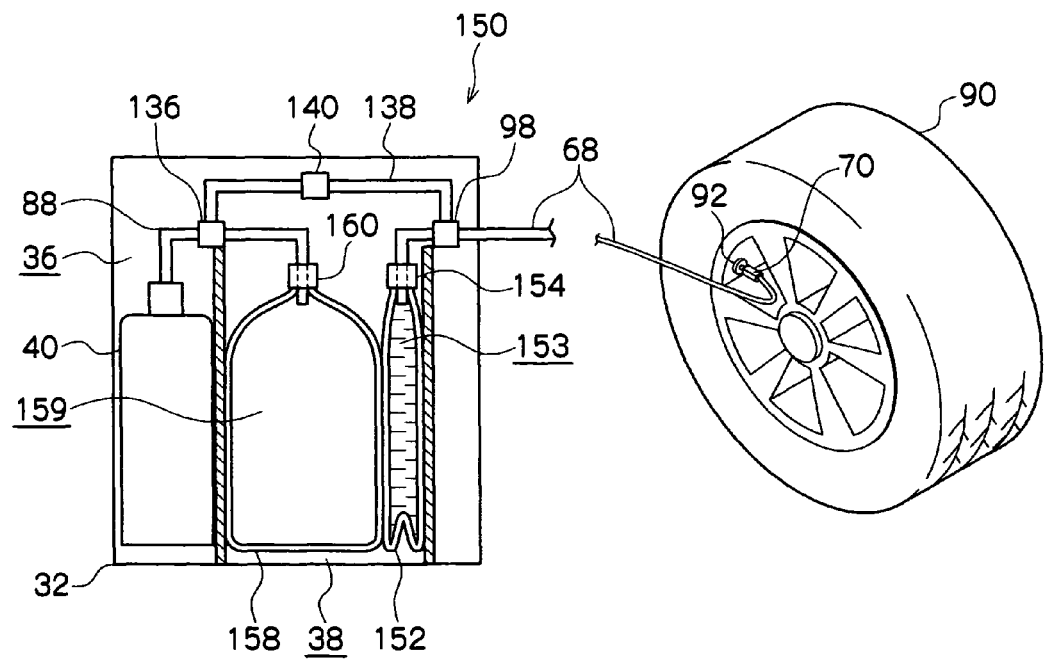
FIG. 4B is a side cross-sectional view of a structure of a sealing and pumping device in accordance with a modified embodiment of a third embodiment of the invention, in a state after the sealing agent is supplied into the tire.

As shown in FIG. 4B, after air container 118 almost completely expands and liquid container 112 undergoes almost complete compression-deformation and a predetermined amount of sealing agent is discharged, the internal pressure (air pressure) of air chamber 159 gradually increases by the air fed from air compressor 40 in a compressed state. With the increase of the internal pressure of air chamber 159, the internal pressure of pressure pipe 88 between air compressor 40 and relief valve 140 also rises. At this time, after the internal pressure of bypass pipe 138 at air compressor 40 side is raised to the open pressure PO, relief valve 140 opens from its closed state to open bypass pipe 138. Thus, air compressor 40 is allowed to communicate with the inside of tire 90 via pressure pipe 88, bypass pipe 138 and joint hose 68, and the compressed air generated by air compressor 40 is began to be supplied into tire 90.

After confirming that the internal pressure of tire 90 has reached predetermined pressure using a pressure gauge (not shown) provided on air compressor 40, the operator stops air compressor 40 and removes the adapter 70 from tire valve 92. The operator conducts test running for a certain distance using tire 90 filled with sealing agent 100 at a certain period of time after tire 90 is inflated. Sealing agent 100 is thus diffused evenly inside tire 90 and is filled into the punctured hole to close it. After the test running, the operator again measures the internal pressure of tire 90 and, if necessary, pressurize tire 90 to predetermined internal pressure. In this manner, the puncture of tire 90 is repaired. Tire 90 can be used for normal running within a certain speed range after joint hose 68 is removed.

In sealing and pumping device 150 according to the present embodiment described above, the same operational effects can be obtained as in sealing and pumping device 110. In addition, because sealing and pumping device 150 employs a bottled pouch as liquid container 152 which receives sealing agent 100, in comparison to sealing and pumping device 110, the operation of mounting liquid container 152 in case 32 and the operation of replacing the used liquid container 152 with a new container in case 32 can be easily conducted. Moreover, space for accommodating sealing agent 100 can be made small. Because the bottled pouch is advantageous in blocking property of moisture (water vapor) and oxygen, sealing and pumping device 150 is suitably used for a long-term storage of sealing agent 100.

Fourth Embodiment

Structure of Sealing and Pumping Device

FIG. 5 illustrates sealing and pumping device 230 for a tire relating to a fifth embodiment of the invention. Sealing and pumping device 230 includes case 232 as housing. Partition wall 234 divides case 232 into two small chambers 236 and 238 in the width direction of sealing and pumping device 230 (direction of arrow W). Air compressor 240 is disposed in small chamber 236. Air compressor 40 includes a power cable (not shown). Electricity can be supplied into air compressor 240 from, for example, a buttery on a vehicle when a plug provided at a distal end of a power cable is fit into a socket of a cigarette liter on the vehicle.

A substantially cylindrical resin-made cylinder container 242 is accommodated in small chamber 238. Substantial disc-shaped plunger 248 is provided in cylinder container 242 which divides cylinder container 242 into two compartments, liquid chamber 244 and air chamber 246. A concave-shaped fitting groove is formed along the entire circumference of plunger 248. Seal ring 250 made of elastic material such as silicone rubber is fitted into the fitting groove. An outer circumferential surface of seal ring 250 is pressed against an inner circumferential surface of cylinder container 242 for sealing the outer circumferential surface of plunger 248 and the inner circumferential surface of cylinder container 242. Plunger 248 can be moved in cylinder container 242 in the height direction with seal ring 250 sliding on the inner circumferential surface of cylinder container 242.

Sealing agent 100 is contained in liquid chamber 244 disposed above plunger 248 of cylinder container 242. In particular, sealing agent 100 is received in liquid chamber 244 in an amount slightly larger than the amount predetermined for each type, size, and the like of tire 90 to be repaired by sealing and pumping device 230 (e.g., 200 to 400 g)

Figure 5A:
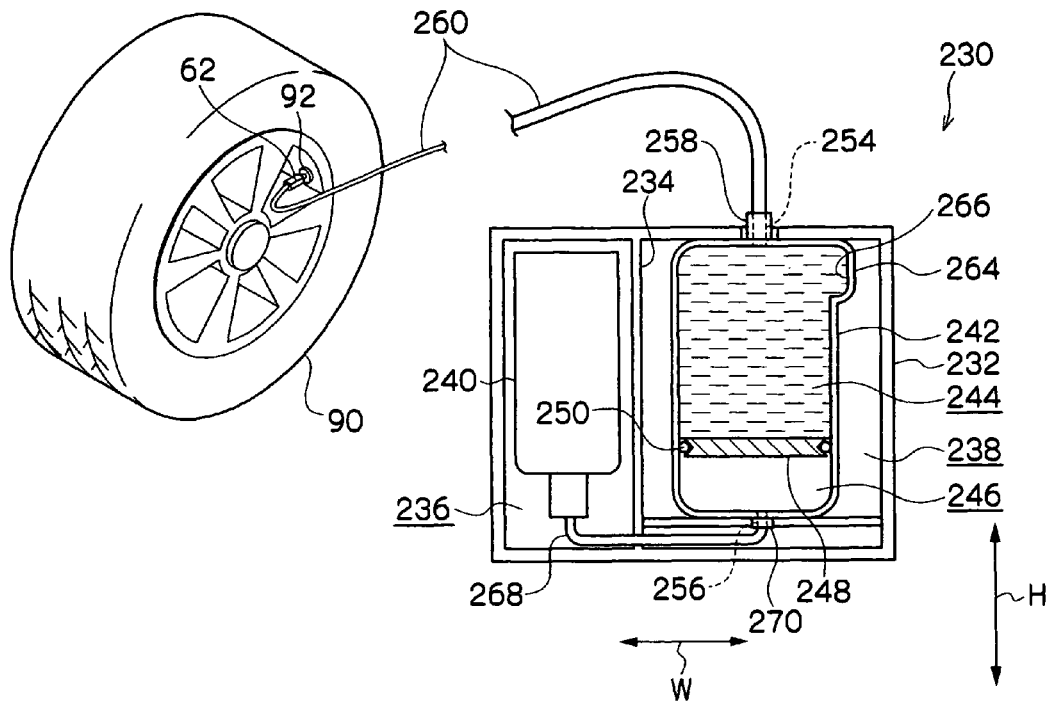
FIG. 5A is a side cross-sectional view of a structure of a sealing and pumping device in accordance with a fourth embodiment of the invention, in a state before a sealing agent is supplied into a tire.

In this state in which sealing agent 100 in an amount slightly larger than the predetermined amount is contained in liquid chamber 244, plunger 248 is held at a lowermost position where the contained volume of liquid chamber 244 shown in FIG. 5A is largest and the contained volume of air chamber 46 is smallest. In sealing and pumping device 230, as plunger 248 moves upward (direction in which sealing agent 100 is injected) from the lowermost position, the contained volume of liquid chamber 44 becomes continuously smaller and the contained volume of air chamber 46 becomes continuously larger.

As shown in FIG. 5A, a cylindrical-shaped upper neck 254 is integrally formed to protrude upward from a top plate of cylinder container 242. Connecting cap 258 provided at a base end of a joint hose 260 is screwed onto an outer circumference of upper neck 54. Adapter 262, which can be screwed to tire valve 92 of tire 90, is provided at a distal end of joint hose 260. When adapter 262 is screwed onto tire valve 92, liquid chamber 244 is allowed to communicate with the inside of tire 90 through joint hose 260.

A cylindrical-shaped lower neck 256 is integrally provided to protrude downward at a central portion of a bottom plate of cylinder container 242. Connecting cap 270 provided at a distal end of pressure pipe 268 is screwed onto an outer circumference of lower neck 256. A base end of pressure pipe 268 is connected to air compressor 240. In this manner, air compressor 240 is allowed to communicate with the inside of air chamber 246 via pressure pipe 268. When actuated, air compressor 40 feeds air (compressed air) generated by air compressor 40 to air chamber 246 via pressure pipe 268. Air compressor 240 is capable of generating pressure higher than reference pressure defined for each type of tire 90 to be repaired by sealing and pumping device 230 (e.g., at least 3 kgf/cm$^2$).

In sealing and pumping device 230, when the compressed air is supplied to air chamber 246 by air compressor 240, the air pressure in air chamber 246 rises. With the rise of the air pressure in air chamber 246, plunger 248 to which the air pressure is applied, moves gradually upward (direction in which sealing agent 100 is injected) against static pressure of sealing agent 100. The contained volume of air chamber 246 thus gradually becomes larger, and the contained volume of liquid chamber 244 decreases by an amount equal to the expansion amount of air chamber 246. Then, sealing agent 100 in liquid chamber 244 is discharged into joint hose 260. Sealing agent 100 is injected into tire 90 via joint hose 260.

Figure 6:
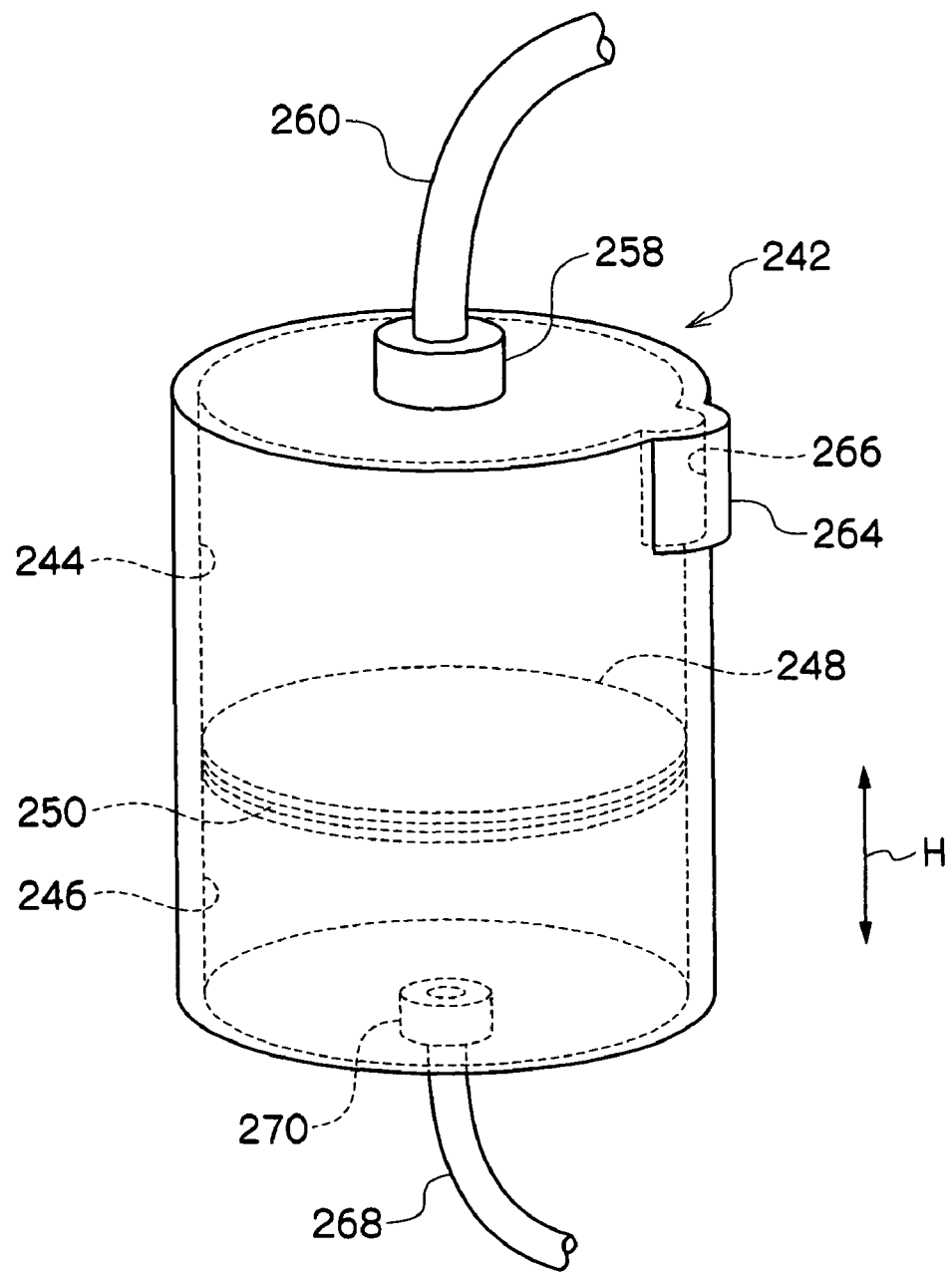
FIG. 6 is a perspective structural view of a cylinder container in the sealing and pumping device shown in FIG. 5.

As shown in FIG. 6, channel forming portion 264 is integrally formed at an upper end of a circumferential wall of cylinder container 242 such that an inner circumferential surface of cylinder container 242 is depressed toward the outer circumference side thereof. Channel forming portion 264 is formed in a semi-cylindrical shape opening toward the inner circumference (inside of cylinder container 242). Both ends of channel forming portion 264 along the height thereof are closed respectively by semi-circular top and bottom plates. A bypass channel 266 having a semi-circular cross-section is formed in channel forming portion 264. Bypass channel 266 is extended along its height from the middle portion of liquid chamber 244 to the top plate of cylinder container 242. The cross-section of bypass channel 266 in the radial direction thereof equals to or is slightly larger than the cross-section of joint hose 260.

Figure 5B:
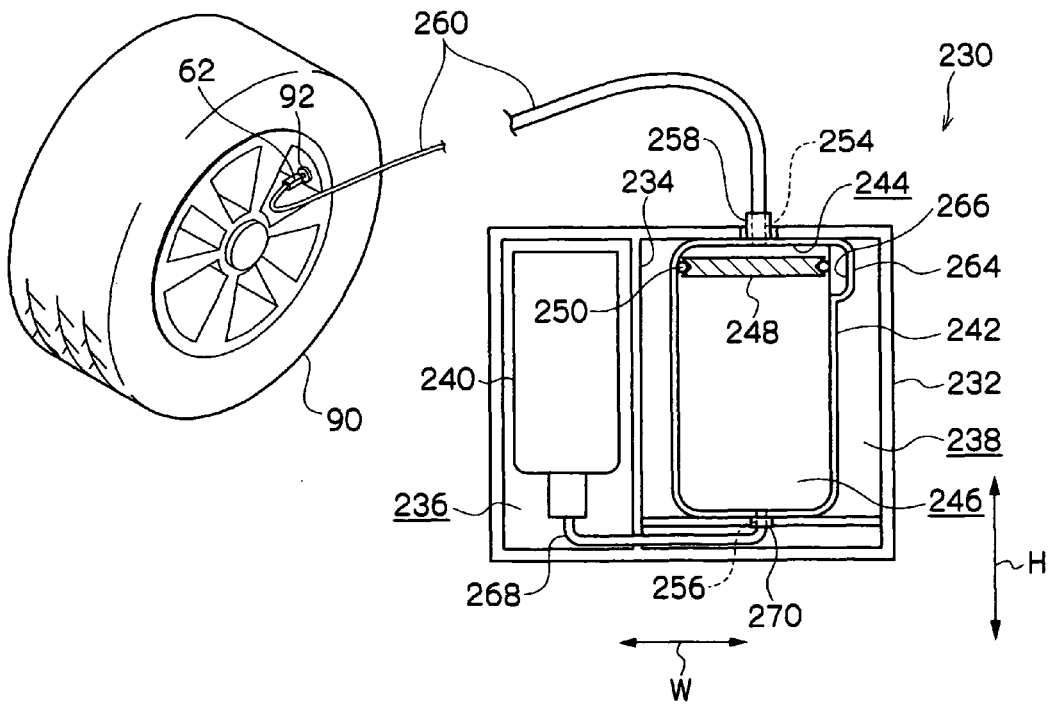
FIG. 5B is a side cross-sectional view of a structure of a sealing and pumping device in accordance with the fourth embodiment of the invention, in a state after the sealing agent is supplied into the tire.

As shown in FIG. 5B, in sealing and pumping device 230, when plunger 48 is moved by pressure of the compressed air and reaches near an upper limit position where the contained volume of liquid chamber 244 is smallest and the contained volume of air chamber 246 is largest, plunger 248 reaches bypass channel 266, and an area on the outer circumferential surface of plunger 248 (seal ring 250) facing with bypass channel 266 is moved away from the inner circumferential surface of cylinder container 242. Air chamber 246 is thus allowed to communicate with liquid chamber 244 via bypass channel 266. Then, the compressed air generated at air compressor 240 can be supplied from air chamber 246 to liquid chamber 244 via bypass channel 266. At this time, almost all of sealing agent 100 filled in liquid chamber 244 has been injected into tire 90 via joint hose 260

Therefore, in sealing and pumping device 230, after plunger 248 reaches the upper limit position, the compressed air generated by air compressor 240 is injected into tire 90 via pressure pipe 268, air chamber 246, bypass channel 266, liquid chamber 244 and joint hose 260. At the time when plunger 248 reaches the upper limit position, a little amount of sealing agent 100 remained in liquid chamber 244 is also partly fed into tire 90 in a compressed state together with the compressed air.

(Operation of Sealing and Pumping Device)

Next, a procedure for repairing a punctured tire 90 using sealing and pumping device 230 of the present embodiment.

To repair a punctured tire 90, an operator first removes a seal cap (not shown) screwed on upper neck 254 of cylinder container 242 and then screws connecting cap 258 of joint hose 260 on upper neck 254. Then, the operator screws adapter 262 of joint hose 260 onto tire valve 92 to allow cylinder container 242 to communicate with the inside of tire 90 via joint hose 260.

Then the operator actuates air compressor 240 so that compressed air generated by air compressor 240 is supplied into air chamber 246 of cylinder container 242 via pressure pipe 268. The internal pressure of air chamber 246 gradually rises, and with the rise of the internal pressure, plunger 248 is moved from the lower limit position in a direction in which sealing agent 100 is injected. Thus, the contained volume of air chamber 246 increases while the contained volume of liquid chamber 244 decreases. Sealing agent 100 in an amount corresponding to the amount of reduction in the contained volume of liquid chamber 244 is forcibly discharged from liquid chamber 244 into joint hose 260. The pressurized sealing agent 100 is injected into tire 90.

As shown in FIG. 5B, after plunger 248 reached near the upper limit position and a predetermined amount of sealing agent is discharged from cylinder container 242, air chamber 246 is allowed to communicate with liquid chamber 244 via bypass channel 266. Thus, the compressed air fed from air compressor 240 into air chamber 246 is supplied into tire 90 via liquid chamber 244, bypass channel 266 and joint hose 260. After confirming that the internal pressure of tire 90 has reached predetermined pressure using a pressure gauge (not shown) provided on air compressor 240, the operator stops air compressor 240 and removes the adapter 262 from tire valve 92.

The operator conducts test running using tire 90 filled with sealing agent 100 in a certain period of time after tire 90 is inflated. Sealing agent 100 is thus diffused evenly inside tire 90 and is filled into the punctured hole to close it. After the test running, the operator again detects the internal pressure of tire 90 and, if necessary, screws adapter 262 of joint hose 260 onto tire valve 92 and actuates air compressor 240 to pressurize tire 90 to predetermined internal pressure. In this manner, the puncture of tire 90 is repaired. Tire 90 can be used for normal running within a certain speed range after joint hose 68 is removed.

In sealing and pumping device 230 according to the embodiment of the invention described above, the compressed air is first supplied by air compressor 40 to air chamber 246 in cylinder container 242 via lower neck 256. Plunger 248 disposed at the lower limit position is moved in the direction in which sealing agent 100 is injected, by the compressed air. Thus the contained volume of air chamber 246 is increased and sealing agent 100 in liquid chamber 244 is pressurized so that the contained volume of liquid chamber 244 decreases. Thus, sealing agent 100 in an amount corresponding to the amount of expansion of the contained volume of air chamber 246, i.e., in an amount corresponding to the reduction in the contained volume of liquid container 244, is forcibly discharged into joint hose 260 and injected into tire 90. With this structure, sealing agent 100 in the amount corresponding to the reduction in the contained volume of liquid container 244 can be reliably supplied into tire 90 regardless of inclination of liquid container 244.

In sealing and pumping device 230, when plunger 248 reaches the upper limit position in cylinder container 242, air chamber 246 is allowed to communicate with liquid chamber 244 via bypass channel 266 provided at cylinder container 242. Thus, air compressor 240 communicates with the inside of tire 90 via air chamber 246, bypass channel 266, liquid chamber 244 and joint hose 260. After the predetermined amount of sealing agent 100 is discharged from liquid container 244, air compressor 240 may communicate with the inside of tire 90 and the compressed air may be supplied into tire 90 by air compressor 240 and tire 90 can be pumped by the compressed air to predetermined pressure.

In sealing and pumping device 230 according to the embodiment, after sealing agent 100 is injected into tire 90, compressed air is supplied into tire 90. With this structure, it is not necessary to displace joint hose 260 with, for example, an air hose for supplying air into tire 90. In this manner, the repair process for punctured tire 90 can be simplified.

MODIFIED EMBODIMENTS

First Modified Embodiment

Figure 7:
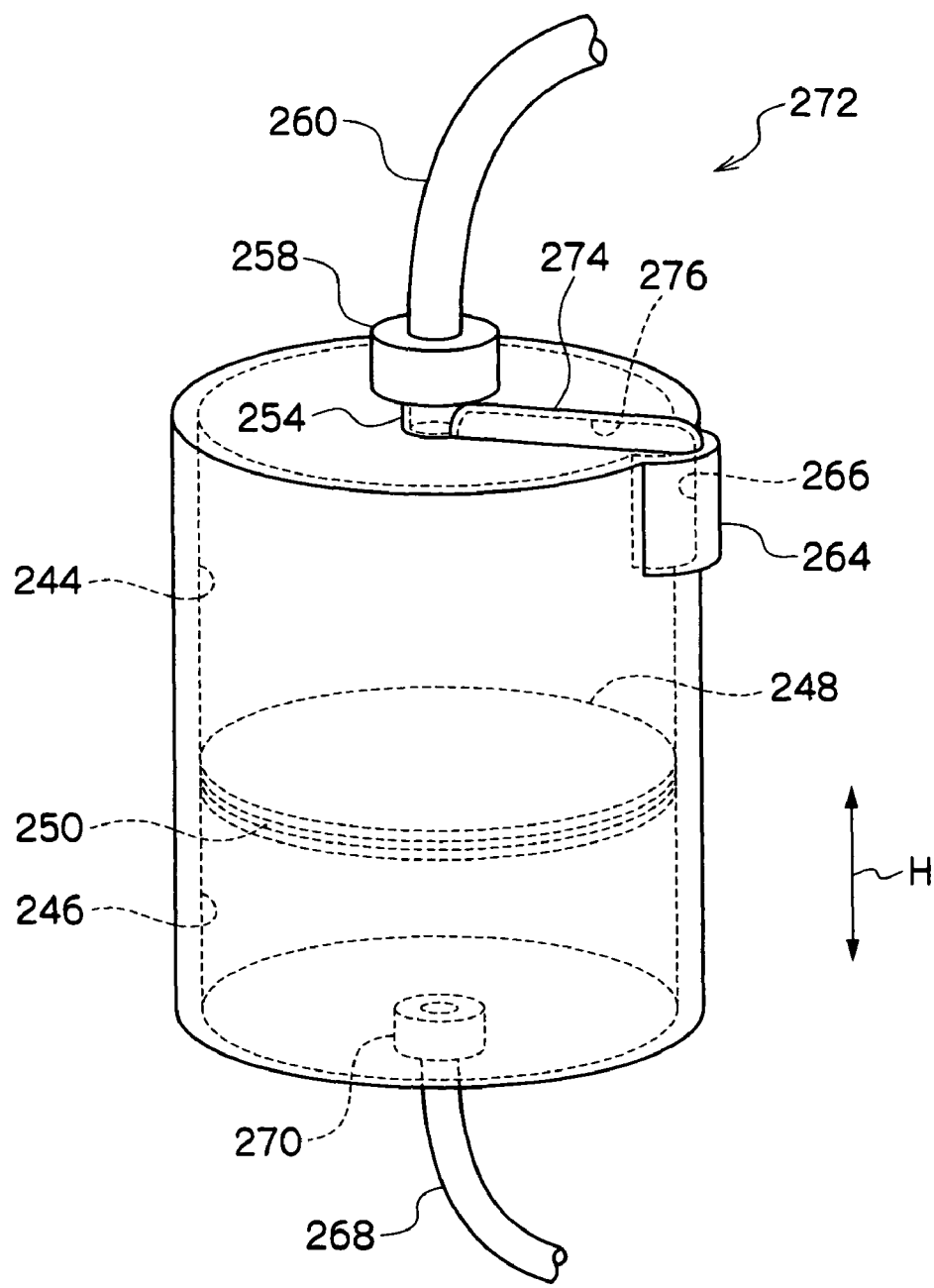
FIG. 7 is a perspective view of a first modified embodiment of a cylinder container in the sealing and pumping device shown in FIG. 5.

FIG. 7 illustrates a first modified embodiment of a cylinder container in a pumping device according to the fourth embodiment of the invention.

As shown in FIG. 7, channel forming portion 264 is integrally formed with cylinder container 272 according to the first modified embodiment as in cylinder container 242 shown in FIG. 6. Bypass channel 266 is formed in channel forming portion 264. Auxiliary channel forming portion 274 is formed at a top plate of cylinder container 272 continuously with channel forming portion 264. Auxiliary channel forming portion 274 is formed in a semi-cylindrical shape opening downward (inside of cylinder container 272) as channel forming portion 264 does. Auxiliary bypass channel 276 having semi-circular cross-section is formed in auxiliary channel forming portion 274 along the radial direction. Auxiliary bypass channel 276 is connected to an upper end of bypass channel 266 at an outer circumferential end thereof and is connected to a cavity in upper neck 54 at an inner circumferential end thereof. The cross-section of auxiliary bypass channel 276 is identical to or slightly larger than that of joint hose 260.

In cylinder container 242 shown in FIG. 6, when plunger 248 is moved upward to reach the top plate of cylinder container 242 by air pressure, an interface between air chamber 246 and a cavity in upper neck 254 is closed by plunger 248. With this structure, compressed air cannot be supplied from air chamber 246 to the cavity in upper neck 254. It is thus necessary to restrict upward movement of plunger 248 by, for example, a stopper such that plunger 248 does not contact the top plate. However, the upper limit position of plunger 248 should be defined below the top plate of cylinder container 242. Thus, even after plunger 248 reaches the upper limit position, there remains a considerable amount of sealing agent 100 in liquid chamber 244. The remaining sealing agent 100 is partly delivered into tire 90 with compressed air. However, it is difficult to deliver the entire remaining sealing agent 100 to tire 90. As a result, a part of sealing agent 100 contained in liquid chamber 244 is wasted.

In contrast, in cylinder container 272 shown in FIG. 7, even after plunger 248 is moved to abut the top plate of cylinder container 242 by air pressure, auxiliary bypass channel 276 permits communication between air chamber 246 and the cavity in upper neck 254. In this manner, the compressed air fed from air compressor 240 to air chamber 246 is supplied into tire 90 via auxiliary bypass channel 276, the cavity in upper neck 254 and joint hose 260. As a result, in cylinder container 242 shown in FIG. 7, the upper limit position of plunger 248 may be set to be a position at which plunger 248 abuts the top plate. Thus, in a state in which plunger 248 reaches the upper limit position, substantially no, or little amount of sealing agent 100 remains in liquid chamber 244.

Second Modified Embodiment

Figure 8:
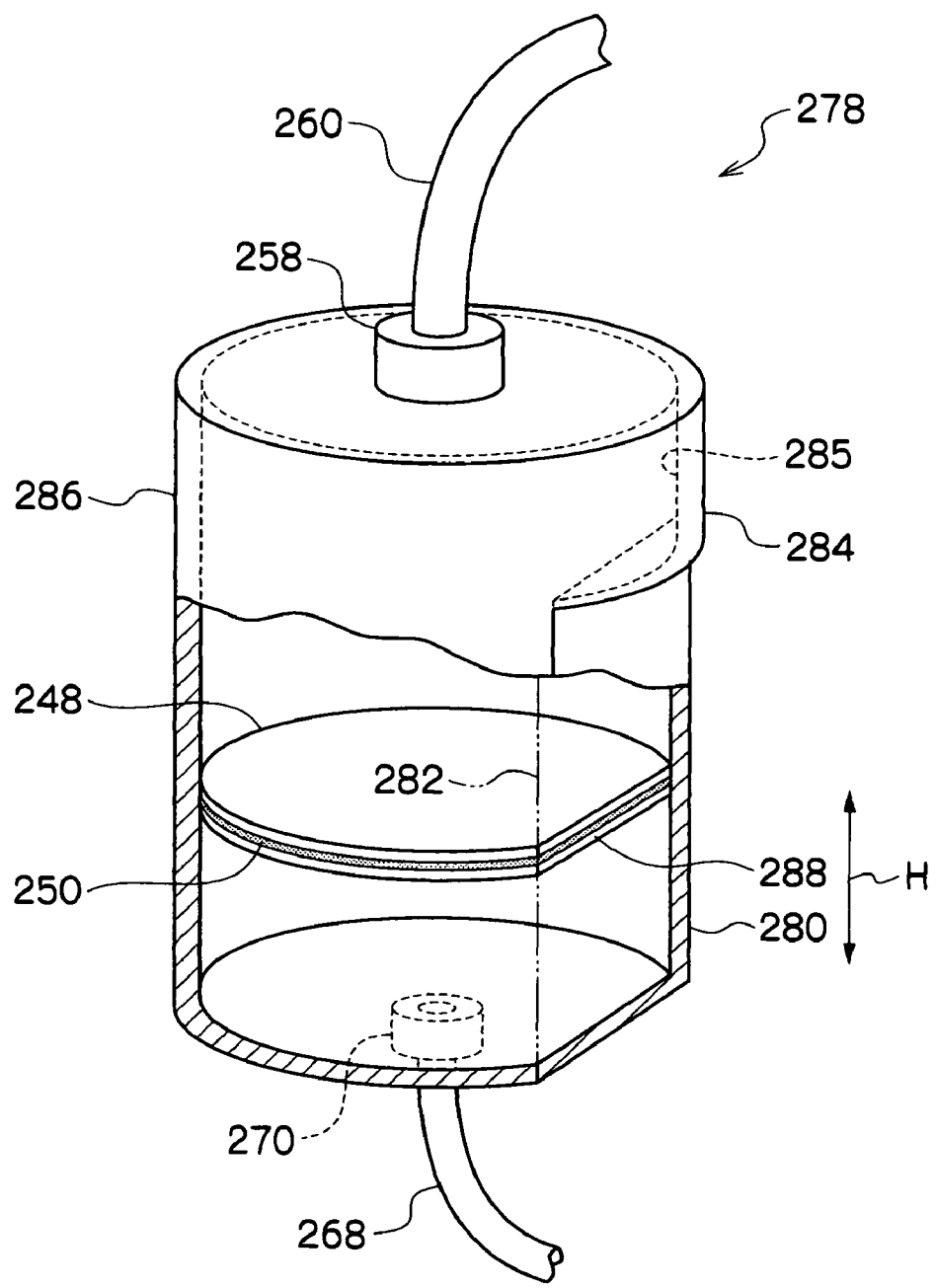
FIG. 8 is a perspective view of a second modified embodiment of a cylinder container in the sealing and pumping device shown in FIG. 5.
Figure 9:
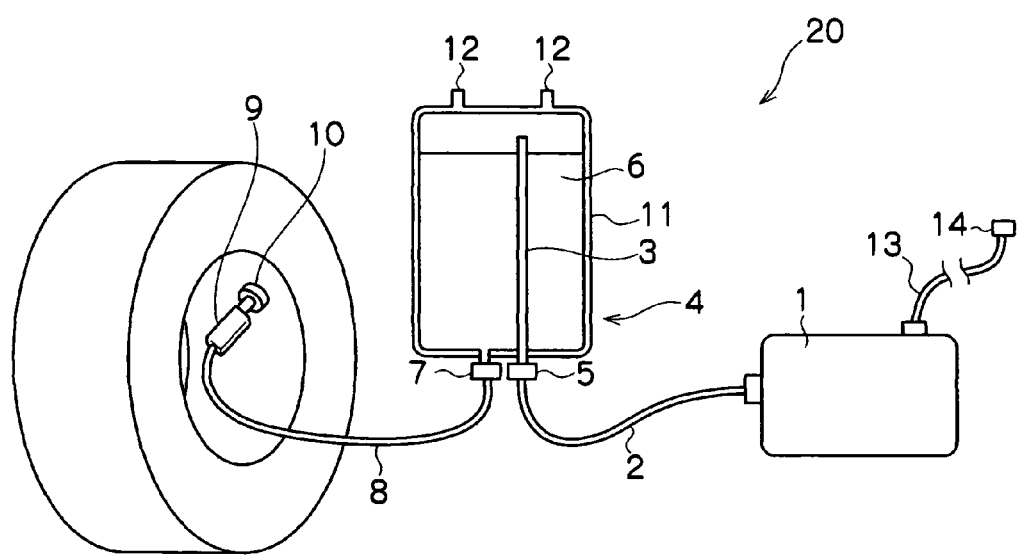
FIG. 9 is a structural view of an exemplary conventional sealing and pumping device.

FIG. 8 illustrates a second modified embodiment of the cylinder container and the plunger in the pumping device according to the fourth embodiment of the invention.

As shown in FIG. 8, noncircular cylindrical portion 280 is provided at a lower portion of cylinder container 278 according to the second modified embodiment. Noncircular cylindrical portion 280 has a noncircular cross-section along its radial direction. Noncircular cylindrical portion 280 includes flat portion 282 which is formed at a radial end of the internal circumferential surface of noncircular cylindrical portion 280 along a chord direction. Cylindrical portion 286 having a circular cross-section is formed at cylinder container 278 above noncircular cylindrical portion 280. Channel forming portion 284, protruding toward an outer circumference of noncircular cylindrical portion 280, is integrally provided with cylindrical portion 286. Bypass channel 285 having a substantially shuttle race back cross-section is formed within channel forming portion 284. Bypass channel 285 extends from the middle portion of liquid chamber 244 to the top plate of cylinder container 242 along the height direction. Here, the cross-section of bypass channel 285 is identical or slightly larger than that of joint hose 260 as in bypass channel 266 shown in FIG. 6.

Plunger 248 is disposed in cylinder container 278. Plunger 248 includes linear portion 288 formed in one end along the chord direction corresponding to the planar portion 282 of the inner circumferential surface of cylinder container 278. Thus, in sealing and pumping device 230 to which cylinder container 278 is applied, after plunger 248 reaches the upper limit position defined above the level of the lower end of bypass channel 266 by air pressure in air chamber 246, air chamber 246 is allowed to communicate with liquid chamber 244 via bypass channel 285. Then the compressed air supplied to air chamber 246 can be supplied into tire 90 via bypass channel 285, liquid chamber 244 and joint hose 260.

In cylinder container 242 shown in FIG. 6, channel forming portion 264 protrudes toward the outer circumference. Thus, if cylinder container 242 is to be accommodated in a container case and the like separately with a main body of sealing and pumping device 230, channel forming portion 264 may diminish accommodating capacity of cylinder container 242. However, in cylinder container 278 shown in FIG. 8, because cylindrical portion 286 in which channel forming portion 284 is formed in cylinder container 278 is circular in cross-section, the accommodating capacity of the cylinder container is sufficient. In addition, cylinder container 278 can be housed efficiently in a small space. Note that, auxiliary bypass channel 276 may also be provided at the top plate of cylinder container 278 according to the second modified embodiment as in cylinder container 272 according to the first modified embodiment, to connect bypass channel 285 and the cavity in upper neck 54.

In sealing and pumping device 230 according to the embodiment described above, channel forming portions 264 and 284 or auxiliary channel forming portion 274 are formed integrally with cylinder containers 242, 272 and 278. It is thus not necessary that cylinder containers 242, 272 and 278 include components for receiving bypass channel 266, 286 or auxiliary bypass channel 276 such as pipes or hoses As a result, the number of device components and process for assembly can be reduced, and the device manufacturing cost is also reduced. Cylinder containers 242, 272 and 278 may be integrally formed by, for example, blow-molding. For example, cylinder containers 242, 272 and 278 may be formed in the following manner: first dividing each of cylinder containers 242, 272 and 278 into a bottomed cylindrical container main body and a cap separated from one end of each of cylinder containers 242, 272 and 278 along its height; then disposing plunger 248 in the container main body; and connecting the cap to the container main body. It is also possible that the container main body and the cap are separately formed and connected to each other to form cylinder containers 242, 272 and 278.

In cylinder container 242 shown in FIG. 6, a single channel forming portion 264 is formed for forming a single bypass channel in which the compressed air flows after injection of sealing agent 100. If the cross-section of the single bypass channel 266 cannot be sufficiently larger than that of the channel in which compressed air flows in pressure pipe 268, plural of channel forming portions 264 may be formed in cylinder container 242. In this case, after sealing agent 100 is injected, the compressed air may be supplied into tire 90 via plural bypass channels 266 formed in each of the plural channel forming portions 264.

After injection of sealing agent 100, sealing agent 100 of high viscosity remain adhered in bypass channel 266 and a substantial cross-section of bypass channel 266 decreases considerably. Further, resistance in circulation in bypass channels 266 and 285 may diminish efficiency in supplying compressed air. To prevent deterioration in supply efficiency of compressed air, the sum of the cross-section of bypass channel 266 should be defined sufficiently larger than the cross-section of the channel in which the compressed air flows in pressure pipe 268.

From the same reason in the case of cylinder container 242, plural channel forming portions 266 and auxiliary channel forming portions 274 may be formed at cylinder container 272 shown in FIG. 7 to increase the cross-section. Further, plural channel forming portions 284 may be formed at cylinder container 278 shown in FIG. 8 to increase the cross-section of bypass channel 285.

Cylinder containers 242, 272 and 278 of the present embodiment may be formed from a light-transmitting material such as colorless transparent resin. If cylinder containers 242, 272 and 278 are formed from a light-transmitting material, the operator may visually confirming remaining amount of sealing agent 100 in the cylinder containers 242, 272 and 278. As a result, the operator may easily confirm repairing processes of the punctured tire.

What is claimed is:

1. A sealing and pumping device for a tire, which injects a liquid sealing agent into a punctured pneumatic tire, and then supplies compressed air into the pneumatic tire to increase internal pressure thereof, the device comprising:

a liquid chamber that receives the sealing agent, and is provided with a first discharge outlet for communicating with the inside of the pneumatic tire, the liquid chamber reducing its contained volume and discharging the sealing agent through the discharge outlet upon receiving predetermined compressive load in a compression direction from outside;

an air chamber provided adjacent to the liquid chamber, a contained volume of the air chamber increasing as internal pressure is raised by compressed air fed therein from outside, and the air chamber decreasing the contained volume of the liquid chamber by applying a load to the liquid chamber in the compression direction via a boundary portion with the liquid chamber;

a circumferential wall surface provided at an outer circumferential side of the boundary portion and forming a part of an inner wall surface of the air chamber; and a second discharge outlet which opens toward the circumferential wall surface, being separated from the air chamber by the boundary portion until a predetermined amount of sealing agent is discharged from the liquid chamber; and moving with respect to the boundary portion to a position where the air chamber to communicate with the inside of the pneumatic tire after the predetermined amount of sealing agent is discharged.

2. The sealing and pumping device of claim 1, further comprising:

a sealing agent supply channel that connects the first discharge outlet to communicate with the inside of the pneumatic tire; and a bypass channel that connects with the second discharge outlet to communicate with the sealing agent supply channel at a middle portion thereof between the first discharge outlet and the pneumatic tire.

3. The sealing and pumping device of claim 1, further comprising:

a cylinder chamber into which compressed air is fed from outside;

a movable partition wall disposed in the cylinder chamber, which divides the cylinder chamber into a first compartment and a second compartment, the movable partition wall being movable in an expansion/contraction direction to make the contained volume of the first compartment increase while the contained volume of the second compartment decreases; and a liquid container disposed in the second compartment and having an accordion-folding structure that is expandable/contractible in the expansion/contraction direction, and includes the liquid chamber formed therein, wherein the first compartment is formed as the air chamber, and the movable partition wall is formed as the boundary portion in the air chamber with the liquid chamber.

4. The sealing and pumping device of claim 1, further comprising:

a cylinder chamber into which compressed air is fed from outside; and a movable partition wall disposed in the cylinder chamber, which divides the cylinder chamber into a first compartment and a second compartment, the movable partition wall being movable in an expansion/contraction direction to make the contained volume of the first compartment increase while the contained volume of the second compartment decreases, wherein the first compartment is formed as the air chamber while the second compartment is formed as the liquid chamber, and the movable partition wall is formed as the boundary portion in the air chamber with the liquid chamber.

5. The sealing and pumping device of claim 3, wherein the second discharge outlet is open to a region of the inner wall of the second compartment until the predetermined amount of sealing agent is discharged from the liquid chamber via the first discharge outlet.

6. The sealing and pumping device of claim 1, further comprising: an air supply device for supplying compressed air into the air chamber to increase the internal pressure of the air chamber.

7. A sealing and pumping device for a tire, which injects a liquid sealing agent into a punctured pneumatic tire, and then supplies compressed air into the pneumatic tire to increase internal pressure thereof, the device comprising:

a liquid container which stores a sealing agent, and is provided with a discharge outlet for communicating with the outside, the liquid container reducing its contained volume and discharging the sealing agent through the discharge outlet upon receiving predetermined load in a compressive direction from outside;

a sealing agent supply path connected to the discharge outlet and to the pneumatic tire, allowing the liquid container to communicate with the inside of the pneumatic tire;

an air container provided adjacent to the liquid container, a contained volume of the air container increasing as internal pressure is raised by compressed air fed from outside and having a contained volume of the liquid container to decrease by applying compressive load to the liquid container;

air supply device which supplies compressed air into the air container to increase a contained volume of the air container;

a bypass channel connected to the air supply device and to the sealing agent supply path to allow the air supply device to communicate with the inside of the pneumatic tire; and air switch means provided at the bypass channel, and is made to open from a state in which it closes the bypass channel to allow the air supply device to communicate with the inside of the pneumatic tire via the bypass channel and the sealing agent supply path, after the air container expands enough to make a predetermined amount of the sealing agent to be discharged from the liquid container, the air switching device is made open, from a state in which it closes the bypass channel, to allow the air supply device to communicate with the inside of the pneumatic tire via the bypass channel and via the sealing agent supply path.

8. The sealing and pumping device of claim 7, further comprising:

the liquid container and the air container each have an accordion-folding structure that is expandable/contractible in a direction in which the contained volume of the liquid container is expanded/contracted; wherein when the air supply device supplies compressed air into the air container to make the air container expand in the direction in which the contained volume of the air container is expanded/contracted, the liquid container is compressed in the direction in which the contained volume of the liquid container is expanded/contracted and the contained volume of the liquid chamber is reduced.

9. The sealing and pumping device of claim 7, further comprising:

the first bottled pouch formed as a pouch with a laminated film as a substrate, the first bottled pouch constituting the liquid container; and a second bottled pouch formed as a pouch with a laminated film as a substrate, and disposed adjacent to the first bottled pouch, the second bottled pouch constituting the air container, wherein when the air supply device supplies compressed air into the second bottled pouch to make the second bottled pouch deform along is expanding direction, the compressive load from the second bottled pouch makes the first bottled pouch deform in a compressive direction and a contained volume of the first bottled pouch is reduced.

10. A sealing and pumping device for a tire, which injects liquid sealing agent into a punctured pneumatic tire, and then supplies compressed air into the pneumatic tire to increase internal pressure thereof, the device comprising:

- a cylinder container that includes a discharge outlet to communicate with the inside of the pneumatic tire and an air supply opening for supplying compressed air into the container, the cylinder container containing a sealing agent;
- a plunger disposed in the cylinder container, dividing the inside of the cylinder container into a liquid chamber containing a sealing agent to be discharged outside of the container via the discharge outlet and an air chamber into which compressed air is supplied via the air supply opening, the plunger being movable in a direction in which the sealing agent is injected to make a contained volume of the air chamber increase and make a contained volume of the liquid chamber decrease;
- air supply device that supplies compressed air into the air chamber via the air supply opening and makes the plunger move in the direction in which the sealing agent is injected by pressure of the compressed air; and
- a bypass channel provided at the cylinder container as a portion on the inner wall surface of the liquid chamber formed as a depression area toward the outside of the container,
- wherein when the plunger moves in a direction in which the sealing agent is injected by an amount enough such that a predetermined amount of the sealing agent is discharged from the liquid container, the air chamber is made to communicate with the liquid chamber.

* * * * *